US006651244B1

(12) United States Patent
Smith et al.

(10) Patent No.: US 6,651,244 B1
(45) Date of Patent: Nov. 18, 2003

(54) SYSTEM AND METHOD FOR DETERMINING PROGRAM COMPLEXITY

(75) Inventors: Tennis Smith, Oakland, CA (US); Dean Hiller, Shrub Oak, NY (US); John Waclawsky, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/361,477

(22) Filed: Jul. 26, 1999

(51) Int. Cl.[7] .............................. G06F 9/45; G06F 9/44; H02H 3/05
(52) U.S. Cl. .................... 717/154; 717/106; 714/38
(58) Field of Search ................... 717/154–158, 717/131–141, 124, 100–106; 345/736, 861; 714/100, 1, 25, 37, 38, 48, 57, 44, 47; 707/1, 3, 200, 203; 703/22; 702/194, 182–185; 700/21

(56) References Cited

U.S. PATENT DOCUMENTS

| | | | | | |
|---|---|---|---|---|---|
| 5,293,629 | A | * | 3/1994 | Conley et al. | 717/154 |
| 5,522,036 | A | * | 5/1996 | Shapiro | 714/36 |
| 5,655,074 | A | * | 8/1997 | Rauscher | 714/25 |
| 5,930,798 | A | * | 7/1999 | Lawler et al. | 717/104 |
| 6,128,773 | A | * | 10/2000 | Snider | 717/132 |
| 6,173,422 | B1 | * | 1/2001 | Kimura et al. | 714/44 |
| 6,219,805 | B1 | * | 4/2001 | Jones et al. | 714/25 |
| 6,343,376 | B1 | * | 1/2002 | Saxe et al. | 717/154 |

OTHER PUBLICATIONS

McCabe et al. Software Complexity. http://www.stsc.hill.af.mil/crosstalk/1994/dec/complex.asp Dec. 1994. pp. 1–9.*

Khoshgoftaar et al. Predicting Software Development Errors Using Software Complexity Metrics. IEEE. 1990. pp. 253–261.*

Anger et al. Temporal Complexity and Software Faults. IEEE. 1994. pp. 115–125.*

Heimann et al. Using Complexity-Tracking In Software Development. IEEE. 1995. pp. 433–438.*

Beane et al. Quantifying Software Designs. IEEE. 1984. pp. 314–322.*

Schildt. C++ From the Ground Up—Learn C++ From The Master. Osborne McGraw–Hill. 1994. p. 175.*

Steve McConnell, "Code Complete A Practical Handbook of Software Construction," 1993, Microsoft, Programming/Procedural Languages, Ch. 17.

Steve McConnell, "Code Complete A Practical Handbook of Software Construction," 1993, Microsoft, Programming/Procedural Languages, Ch. 17.

* cited by examiner

Primary Examiner—Wei Zhen
(74) Attorney, Agent, or Firm—Ritter, Long & Kaplan LLP (57) ABSTRACT

A system and method for determining complexity of a computer subroutine having a plurality of statements, during development of the subroutine is disclosed. The method includes analyzing the plurality of statements and computing a complexity factor for a completed portion of the subroutine. The steps of analyzing the subroutine and computing a complexity factor are repeated following input of another statement into the subroutine. A system for determining complexity of a subroutine comprises an analyzer operable to analyze the statements and compute a complexity factor following the input of one of the plurality of statements.

28 Claims, 5 Drawing Sheets

SYSTEM AND METHOD FOR DETERMINING PROGRAM COMPLEXITY

BACKGROUND OF THE INVENTION

The present invention relates generally to creating or developing computer programs, and more specifically, to systems and methods for determining the complexity of a computer program with a view to ensuring code quality.

As computer programs expand in size and complexity, the need to assess the reliability of software becomes more important so that appropriate corrective action can be taken prior to releasing the software. Assuring the reliability of software helps to minimize software development costs, reduces support costs, improve software quality, increase programmer productivity, and shorten software development time. By controlling the quality and reliability of a program, more precise, predictable and repeatable control can be had over software development process and product. Complexity measurement algorithms are used to analyze code of computer programs to determine the complexity and predict the reliability of the computer programs. Program complexity is an important measurement since an increase in program complexity has been shown to result in a decrease in reliability and an increase in program errors and support costs. Moreover, the more complex a program is, the more difficult it is to debug or modify, since a higher amount of concentration is required to understand the program.

The complexity of a program can be measured by a number of different metrics. One popular numeric technique for measuring complexity is the McCabe cyclomatic complexity metric which is described in *A Complexity Measure*, IEEE *Transactions on Software Engineering*, Volume 2, No. 4 (December 1976), pp. 308–320, by Tom McCabe, which is incorporated herein by reference in its entirety. McCabe measures complexity by counting the number of decision points in a computer routine. For example, a straight path through the routine counts as one. One is then added for each of the following keywords, or their equivalents (depending on which programming language is used): if, while, repeat, for, and, or. A case statement results in addition of another one. After counting the decision points, the total is used to analyze the complexity of the routine. For example, if the total is between one and five the reliability of the routine is probably acceptable. Ideally, if the total is between six and ten, the programmer should start to think about ways to simplify the routine. The routine should be broken into smaller subroutines or modified if the total is above ten. Additional metrics could include date related software metrics, object oriented software metrics, and line count software metrics. Other complexity measurements include the amount of data used, the number of variables used in a subroutine, the number of nesting levels in control constructs, the number of lines of code, the number of lines between successive references to variables, and the number of input and output values.

The complexity of a program is typically checked after the program is completed. The finished program may be run through a program which analyzes the complete computer program and provides a breakdown of complexity metrics for the subroutines. A problem with this type of measurement is that it is difficult to revise the program to reduce the complexity after the entire program has been written. In order to reduce the complexity factor, entire subroutines or a major part of the program may have to be rewritten, thus requiring a significant amount of reprogramming time.

There is, therefore, a need for a system and method for measuring the complexity of computer programs while the program is being entered into a computer system and providing a programmer with up to date complexity statistics of the program so that the programmer can make changes to the program while it is being created.

SUMMARY OF THE INVENTION

A system and method for determining complexity of a computer subroutine during development of the subroutine is disclosed.

A method for determining the complexity factor includes analyzing a plurality of statements of the subroutine and computing a complexity factor for a completed portion of the subroutine. The steps of analyzing the subroutine and computing a complexity factor are repeated following input of another statement into the subroutine.

A system for determining the complexity factor includes an analyzer operable to analyze the statements and produce a complexity factor following the input of one of the plurality of statements into the subroutine.

In one embodiment, the system includes a notification system operable to notify a user of the system when the complexity factor of the subroutine exceeds a maximum value. The notification system may provide a visual notification, an audio notification, or both. The notification system may also notify the user of the computed complexity factor.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

Figure 1:
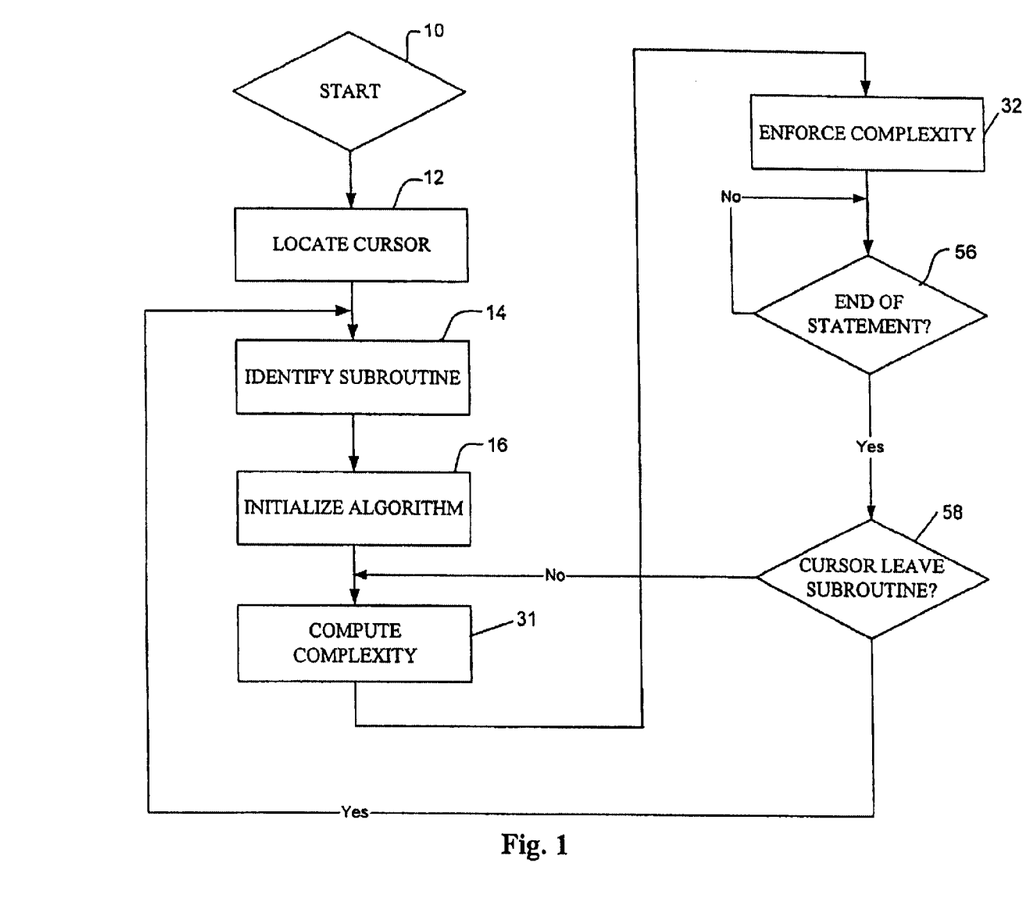
FIG. 1 is a flow diagram illustrating a process of a system for determining complexity of a computer subroutine.

Referring now to the drawings, and first to FIG. 1, a process flow diagram of a complexity analyzer system is shown. The system is used to determine the complexity of a plurality of statements within computer program code. The code may be a portion of a subroutine (routine, function, procedure, method), one or more subroutines, or one or more computer programs, as further described below. Computer code complexity factors are used to predict the reliability, quality, and workability of a program. For example, the less complex a program is, the less likely it is to have errors and the easier it will be to support, debug or modify the program in the future. Conventional systems used to analyze the complexity of a computer program are applied to the program after the program is completed. It is difficult, however, to modify the program to reduce the complexity of the program after it has already been completed. The complexity analyzer system disclosed herein allows for continuous monitoring and tracking of the complexity of a subroutine or computer program while it is being written. The system is preferably run interactively while the programmer is actually entering the code. The system notifies the programmer when a complexity factor, which represents the complexity of the completed code, has reached an unacceptable level, or when the complexity factor is getting close to this level, so that the programmer can take steps to actively reduce program complexity while creating the program.

The complexity factor used by the complexity analyzer system may be McCabe's cyclomatic complexity number system (described in McCabe (1976): Complexity Measure, *IEEE Transactions on Software Engineering,* Volume 2, No. 4, pp. 308–320, December 1976, referenced above), for example. McCabe's system measures the number of independent paths in a program, thereby placing a numerical value on the complexity. In practice, it is a count of the number of test conditions in a program. For example, to determine the complexity of a routine, a one is first counted for a straight path through the subroutine, and one is added for each of the following keywords (or their equivalents): if, while, repeat, for, and, or. A complexity factor of between zero and five typically signifies that the program will have acceptable reliability. When the complexity factor reaches between six and ten, the programmer should begin to think of ways to simplify the subroutine. A complexity factor higher than ten indicates that the program may have lower reliability and frequent errors. It is to be understood that complexity metrics other than the McCabe metrics described herein may be used without departing from the scope of the invention.

The complexity analyzer system may be configured for use with a file editor such as Emacs, or any other suitable program editor. The system may also be implemented as part of an integrated development environment. The editor is preferably a real time editor which updates the display frequently so that the programmer is notified when the complexity factor limit is exceeded. The display may be updated after each character or pair of characters are typed, for example.

The editor is preferably configured such that when a complexity factor limit is exceeded, visual and audio warnings are displayed to the programmer. For example, the text or background color may change (e.g., yellow when a first complexity threshold is reached, and red when a second threshold is reached). A warning symbol may also appear in a portion of the screen, such as an upper right corner, for example. The calculated complexity factor may also be displayed on the screen so that the programmer can always check what the actual complexity factor is for the completed portion of the subroutine. The audio warning may be a beeping signal, music, or any other signal which alerts the programmer either that he is approaching the complexity factor limit or has exceeded the limit. For example, the programmer may hear a quiet beep when he is approaching the limit and a louder beep once he has exceeded the limit. It is to be understood that warnings other than those described herein may be used without departing from the scope of the invention. For example, the programmer may only receive video or audio warnings, but not both. Also, it is possible to notify a system administrator when the complexity limit is exceeded, or store information relating to changes in the complexity factor as the subroutine is being written in a database, for example.

In addition to notifying the programmer when the complexity factor limit has been exceeded, a non-compilable statement is preferably inserted into the code itself so that the program will not compile. This will prevent a programmer from ignoring the warnings and attempting to complete, compile, and run a program with an unacceptable complexity limit. The non-compilable statement is inserted into the code at an appropriate location (e.g., beginning or end of a subroutine or program) and is preferably configured such that the editor does not allow for removal of the statement by the programmer.

Figure 2:
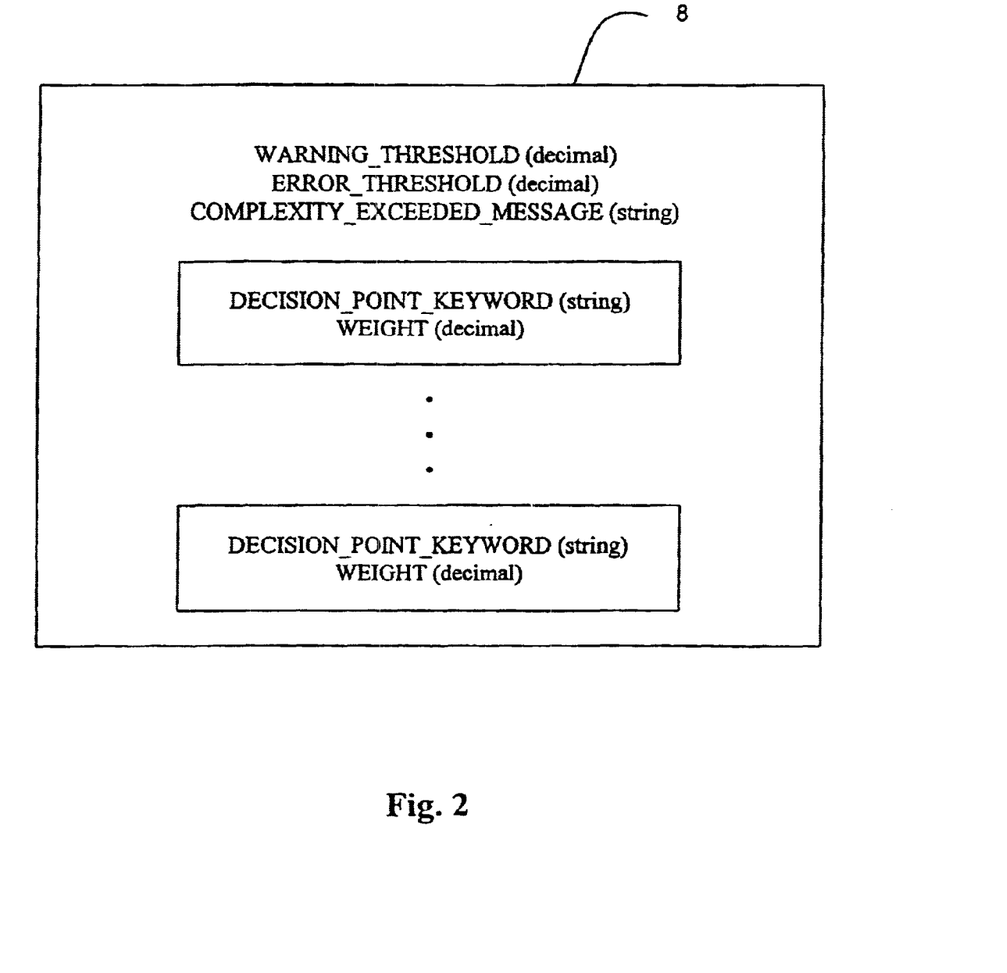
FIG. 2 is a decision point table used in the process shown in FIG. 1.

Information on the complexity factor thresholds (e.g., warning level and error level), along with weights to be applied to specific types of statements and the non-compilable string to be inserted into the subroutine when the error level is reached are stored in a decision point table 8 (FIG. 2). The table includes a WARNING_THRESHOLD, ERROR_THRESHOLD, COMPLEXITY_EXCEEDED_MESSAGE, DECISION_POINT_KEYWORDS, and WEIGHTS. The WARNING_THRESHOLD is a complexity factor limit (e.g., seven) which provides the programmer with a warning before he actually reaches the complexity factor limit (e.g., ten). When the complexity factor of the routine reaches this threshold, the programmer is warned that he is coming close to exceeding the maximum allowable complexity factor for the subroutine. At this time, the programmer may go back and revise the subroutine to reduce the overall complexity, or continue, if he is almost complete with the subroutine, for example. The programmer must proceed with caution when writing the code for the rest of the subroutine so that he does not exceed the complexity factor limit. The decision point table 8 also includes an ERROR_THRESHOLD which is the maximum complexity factor (e.g., ten) that the routine is allowed to reach. The WARNING_THRESHOLD and ERROR_THRESHOLD are originally set by a system administrator, for example, and can be redefined by the specific program or subroutine the programmer is working on, as further described below. The system administrator selects a first complexity factor threshold (e.g., seven) for which a warning message is displayed to the programmer and a second complexity factor threshold (e.g., ten) for which an error message is displayed to the programmer. These complexity factor threshold values are preferably stored in an external file such as a public library, along with the decision point keywords and weights.

The COMPLEXITY_EXCEEDED_MESSAGE contains the non-compilable string which is inserted into the program to prevent the program from successfully compiling. As previously discussed, the string is inserted into the program or subroutine when the complexity factor of the subroutine exceeds the error threshold provided in the decision point table 8.

The keywords that increase the complexity of the program (e.g., if, while, repeat, for, and, or, switch) are listed in the decision point table 8 as DECISION_POINT_KEYWORDS. There are multiple decision point keywords, which vary depending on which program language is being used. Each of these keywords may also be assigned a weight (e.g., 1.003). The weights allow the system to be modified to place a lower factor on critical statements which may be necessary within the routine even if they increase the complexity factor, and a higher factor on statements which typically result in errors in programs.

The decision point table 8 is created each time the system initializes an analysis algorithm for checking the complexity of a subroutine, as described below with respect to FIGS. 1, 2, and 3. The decision point table 8 is preferably stored in temporary memory within the host computer. It is to be understood that the decision point table 8 may be configured differently than shown herein or contain different parameters than those listed without departing from the scope of the invention. For example, the warning threshold may be removed and only an error threshold provided, and the weights may be removed to simplify the system, and reduce memory and processing requirements.

The following describes a process for using the complexity analyzer system to check a subroutine (e.g., as defined in Fortran language), function (e.g., C language), procedure (e.g., Pascal language), or method (e.g., C++ language) of a computer program, for example. It is to be understood that the term 'subroutine' used below, may refer to a method, procedure, function, or the entire computer program, or any other group of statements, for example. The system may be used to check an entire program or portions of a subroutine, or any other similar group of code statements. The term 'statement' describes a single statement such as an if . . . then statement, for example, or a group of statements. A statement may include one or more decision points, or no decision points. The system may be tailored for use with C, C++, Java, Visual Basic, COBOL, FORTRAN, Pascal, Ada, or any other computer programming language.

The program is started at step 10 when the file editor is opened, for example. The complexity analyzer system may also be activated after the file editor is opened. The system first locates a cursor on the editing screen to identify the subroutine in which the programmer is working (step 12). The program next locates the beginning and end (if completed) of the subroutine (step 14). The analysis algorithm is then initialized (step 16), as shown in the process flow chart of FIG. 3, and the program analyzes the code. In order to initialize the analysis algorithm, the system first reads from the external file which contains the global criteria (e.g., WARNING_THRESHOLD, ERROR THRESHOLD, COMPLEXITY_EXCEEEDED MESSAGE, DECISION_POINT_KEYWORDS, and WEIGHTS) (step 18). This information is used to create the decision point table 8 shown in FIG. 2 and described above. The system next determines if there are any changes to the original threshold values read from the external file. As previously discussed, the threshold values and weights may be adjusted for specific programs or subroutines. For example, there may be a subroutine in which the only efficient way to perform a function results in a subroutine with a complexity factor above the original limit. By varying the weight of the decision point keywords, the system can be tailored for a specific application a programmer is working on.

At step 22, the system checks to see if there is any program specific criteria. This information may be located in comments at the beginning or end of a file, or other locations within the program. The comments are used to override the global criteria (threshold values and weights) contained in the external file. There may also be different criteria for threshold values and weights placed within the subroutine itself. After checking the program for a change in the global criteria, the subroutine is checked to see if it contains any changes to complexity factor limits or weights (step 26). The criteria for a specific subroutine will override the program criteria and the global criteria located in the external file. If there is program or subroutine specific criteria which is different than the original threshold or weight values provided by the external file, the decision point table 8 is updated to reflect these new values (steps 24 and 28). Special keywords may be required within the program or subroutine to change the threshold and weight values provided in the external file. This can be used to prevent programmers from changing the global criteria located in the external file, without prior permission. The system next returns (step 30) to the initial process flowchart of FIG. 1 and computes the complexity factor (step 31) for the subroutine (FIGS. 1 and 3).

The complexity factor is computed based on the decision point keywords and weights provided in the decision point table 8 (as modified in steps 24 or 26). The complexity factor is enforced at step 32 by the process illustrated in FIG. 4. The system first removes any visual warning or stops an audio warning which is present (step 34). For example, if after entering the last statement, the screen of the editor changed to yellow to warn the programmer that the subroutine had reached the warning threshold, the screen would now be changed back to its original color. This is accomplished so that if the programmer has made changes to the subroutine, he will be able to see if these changes have reduced (increased, or had no impact on) the complexity factor. If the new composite complexity factor exceeds the error threshold limit (step 36) a visual notification (step 38) and audio notification (step 40) is provided, as previously described. The non-compilable string may also be inserted into the code so that the program cannot be compiled (step 42). If the error threshold has not been exceeded, the system determines whether the complexity factor exceeds the warning threshold (step 44). If the warning limit is exceeded the appropriate visual notification (step 46) and audio notification (step 48) are provided to the programmer. If the error threshold was previously exceeded, but the subroutine was modified and the complexity factor reduced so that the level was below the error limit, the non-compilable string that was previously inserted into the subroutine will be removed (steps 50–52). The process then returns to the process illustrated in FIG. 1 (step 54).

The complexity analyzer system waits until a new statement is entered (step 56). The system may be configured to recognize the end of a statement when a return key is hit or when a semicolon is entered, for example. Each time a new statement is entered, the system checks to see if the cursor has left the subroutine (step 58). If the cursor has moved to a new subroutine, the subroutine must be identified (step 14), algorithm initialized (step 16), and the complexity computed (step 31). If a new statement is entered within the same subroutine, the system returns directly to step 31 and the complexity factor is recalculated. Every time the complexity factor is recalculated, it is preferably calculated for the entire subroutine so that any changes made to the subroutine are included in the calculation of the new complexity factor.

Figure 3:
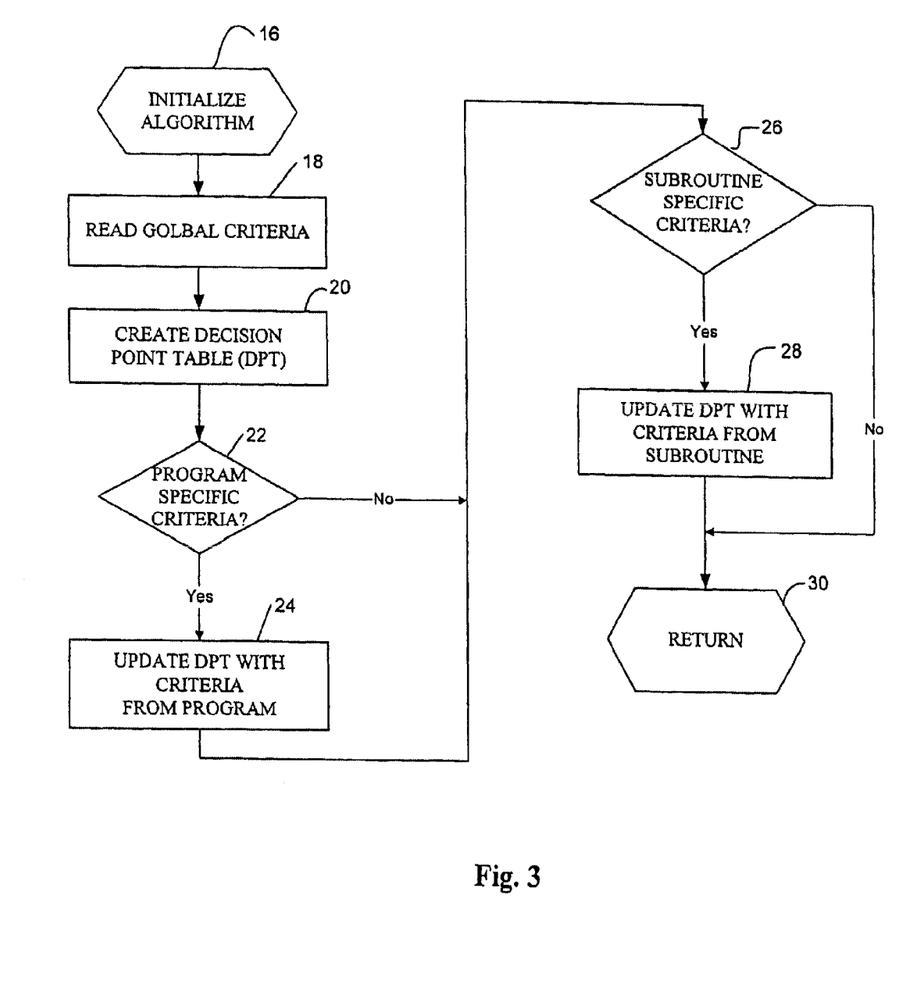
FIG. 3 is a process flow diagram illustrating steps of an algorithm initialization step of the process shown in FIG. 1.
Figure 4:
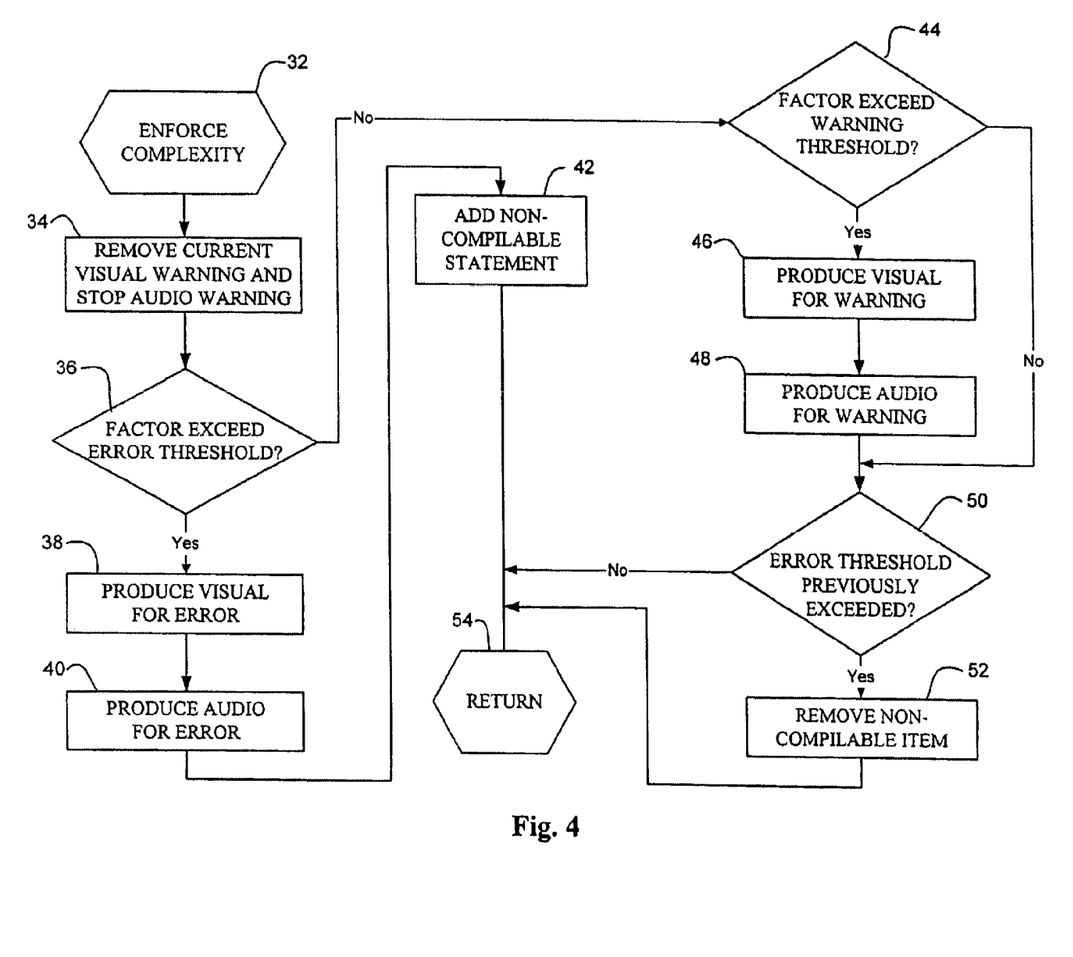
FIG. 4 is a process flow diagram illustrating steps of a complexity enforcement step of the process shown in FIG. 1.

It is to be understood that the order of steps of the process flow diagrams shown in FIGS. 1, 3, and 4, may be changed and some steps may be removed or new steps added without departing from the scope of the invention.

Figure 5:
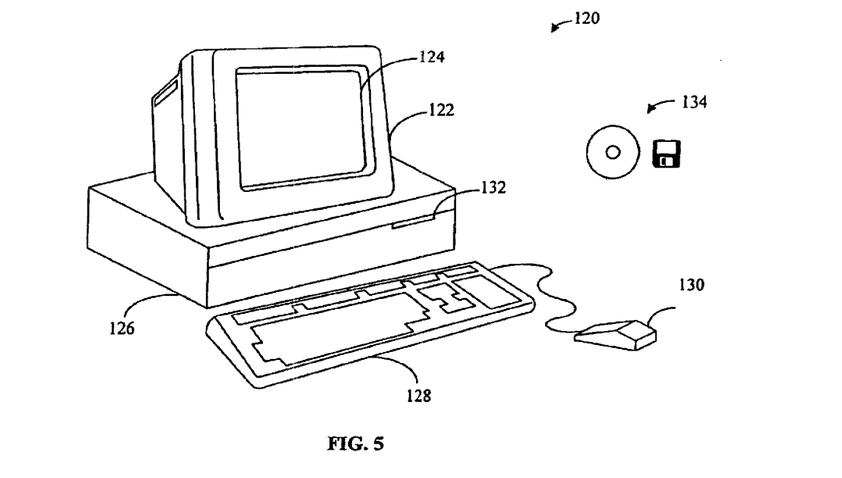
FIG. 5 illustrates an example of a computer system that can be utilized to execute software of an embodiment of the invention.

FIG. 5 illustrates an example of a computer system that can be used to execute the software of an embodiment of the invention. FIG. 5 shows a computer system 120 that includes a display 122, screen 124, cabinet 126, keyboard 128, and mouse 130. Mouse 130 can have one or more buttons for interacting with a GUI. Cabinet 126 houses a CD-ROM drive 132, system memory and a hard drive (see FIG. 6) which can be utilized to store and retrieve software programs incorporating computer code that implements aspects of the invention, data for use with the invention, and the like. Although CD-ROM 134 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 6:
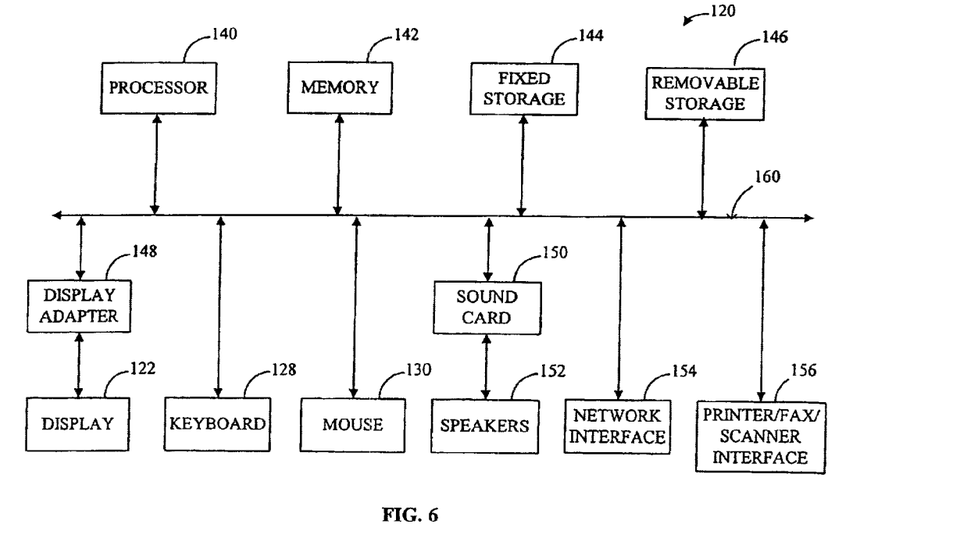
FIG. 6 illustrates a system block diagram of the computer system of FIG. 5.

FIG. 6 shows a system block diagram of computer system 120 used to execute software of an embodiment of the invention. Computer system 120 further includes subsystems such as a central processor 140, system memory 142, fixed storage 144 (e.g., hard drive), removable storage 146 (e.g., CD-ROM drive), display adapter 148, sound card 150, transducers 152 (speakers, microphones, and the like), network interface 154, and printer/fax, scanner interface. Other computer systems suitable for use with the invention can include additional or fewer subsystems. For example, another computer system could include more than one processor 140 (i.e., a multi-processor system) or a cache memory.

The system bus architecture of computer system 120 is represented by arrows 160. However, these arrows are illustrative of any interconnection scheme serving to link the subsystems. For example, a local bus could be utilized to connect the central processor to the system memory and display adapter. Computer system 120 shown in FIG. 6 is but an example of a computer system suitable for use with the invention. Other computer architectures having different configurations of subsystems can also be utilized.

In view of the above, it will be seen that the several objects of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

What is claimed is:

1. A method for determining complexity of an incomplete computer comprising a plurality of statements, during development of the subroutine, the method comprising:

analyzing said plurality of statements;

computing a complexity factor for a completed portion of the subroutine;

inserting a non-compilable string of code into the subroutine when the complexity factor exceeds a maximum allowable value; and repeating analyzing the subroutine and computing a complexity factor following input of another statement into the subroutine.

2. The method of claim 1 further comprising notifying a user if the complexity factor exceeds a warning threshold after input of one of said plurality of statements into the subroutine.

3. The method of claim 2 wherein notifying the user comprises providing a visual indication.

4. The method of claim 2 wherein notifying the user comprises changing a background color of a computer screen.

5. The method of claim 2 wherein notifying the user comprises providing an audible indication.

6. The method of claim 2 further comprising notifying the user when the complexity factor reaches a warning level to inform the user that the complexity factor is close to the maximum allowable value.

7. The method of claim 1 further comprising defining the maximum allowable value for the complexity factor.

8. The method of claim 7 wherein defining the maximum allowable value of the complexity factor comprises reading the value from a file.

9. The method of claim 8 further comprising replacing the maximum allowable value read from the file with a revised value read from a program containing the subroutine.

10. The method of claim 8 further comprising replacing the maximum allowable value read from the file with a revised value read from the subroutine.

11. The method of claim 1 further comprising notifying the user of the computed complexity factor.

12. A method for determining complexity of an incomplete computer subroutine comprising a plurality of statements, during development of the subroutine, the method comprising:

analyzing said plurality of statements;

computing a complexity factor for a completed portion of the subroutine by assigning weights to decision point keywords in the subroutine; and repeating analyzing the subroutine and computing a complexity factor following input of another statement into the subroutine.

13. The method of claim 12 further comprising creating a table containing the decision point keywords and weight for each of the keywords.

14. A system for determining complexity of an incomplete computer subroutine comprising a plurality of statements, during development of the subroutine, the system comprising:

an analyzer operable to analyze a completed portion of the subroutine and compute a complexity factor following the input of one of said plurality of statements into the subroutine; and a notification system operable to insert a non-compilable string of code into the subroutine when the complexity factor reaches a maximum allowable value.

15. The system of claim 14 wherein the notification system is operable to notify the user when the complexity factor reaches a warning level.

16. The system of claim 14 wherein the notification system comprises a visual indicator.

17. The system of claim 16 wherein the visual indicator is operable to change a background color of a computer screen.

18. The system of claim 14 wherein the notification system comprises an audible indicator.

19. The system of claim 14 wherein the notification system is operable to notify a user of the complexity factor of the completed portion of the subroutine.

20. The system of claim 14 wherein the analyzer includes a counter operable to count the number of decision point keywords within the completed portion of the subroutine.

21. A system for determining complexity of an incomplete computer subroutine comprising a plurality of statements, during development of the subroutine, the system comprising:

an analyzer operable to analyze a completed portion of the subroutine and compute a complexity factor following the input of one of said plurality of statements into the subroutine, the analyzer comprising a counter operable to count the number of decision point keywords within the completed portion of the subroutine; and a table containing weights for each of the decision point keywords, the analyzer being operable to apply the weights to the decision point keywords to compute the complexity factor.

22. The system of claim 21 further comprising a table generator operable to generate the table from data located in a file.

23. The system of claim 22 wherein the table generator is operable to revise the table based on commands located within the subroutine.

24. A computer program product for determining complexity of an incomplete computer comprising a plurality of statements, during development of the subroutine, the product comprising:

computer code that analyzes a completed portion of the subroutine;

computer code that computes a complexity factor following the input of one of said plurality of statements into the subroutine;

computer code that inserts a non-compilable string of code into the subroutine when the complexity factor exceeds a maximum allowable value; and a computer readable medium that stores the computer codes.

25. The computer program product of claim 24 further comprising computer code that produces a warning when the complexity factor exceeds a maximum allowable value.

26. The computer program product of claim 24 wherein the computer readable medium is selected from the group consisting of CD-ROM, zip disk, tape, flash memory, system memory, hard drive, and data signal embodied in a carrier wave.

27. A method for identifying incomplete computer subroutine complexity during input of statements forming the subroutine into a computer, the method comprising:

inputting a statement during development of a subroutine;

analyzing said statement along with previously entered statements of the subroutine;

computing a complexity factor for a completed portion of the subroutine;

updating the complexity factor upon input of a new statement; and preventing the subroutine from running when the complexity factor exceeds a maximum allowable value by inserting a non-compilable string of code into the subroutine.

28. A method for identifying incomplete computer subroutine complexity during input of statements forming the subroutine into a computer, the method comprising:

inputting a statement during development of a subroutine;

analyzing said statement along with previously entered statements of the subroutine;

computing a complexity factor for a completed portion of the subroutine by assigning weights to decision point keywords in the subroutine; and updating the complexity factor upon input of a new statement.

* * * * *